United States Patent
Greci et al.

(10) Patent No.: US 11,499,399 B2
(45) Date of Patent: Nov. 15, 2022

(54) PRESSURE REDUCING METAL ELEMENTS FOR LINER HANGERS

(71) Applicant: Halliburton Energy Services, Inc., Houston, TX (US)

(72) Inventors: Stephen Michael Greci, Little Elm, TX (US); Michael Linley Fripp, Carrollton, TX (US); Emile Edmund Sevadjian, Carrollton, TX (US); Abdolreza Gharesi, Southlake, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/719,586

(22) Filed: Dec. 18, 2019

(65) Prior Publication Data
US 2021/0189842 A1    Jun. 24, 2021

(51) Int. Cl.
*E21B 43/10* (2006.01)
*E21B 33/12* (2006.01)
*E21B 33/13* (2006.01)

(52) U.S. Cl.
CPC .......... *E21B 43/10* (2013.01); *E21B 33/1212* (2013.01); *E21B 33/13* (2013.01); *E21B 43/103* (2013.01)

(58) Field of Classification Search
CPC ........ E21B 43/103; E21B 33/13; E21B 43/10; E21B 33/0415; E21B 33/0422
See application file for complete search history.

(56) References Cited

U.S. PATENT DOCUMENTS

| | | |
|---|---|---|
| 1,982,569 A | 11/1934 | Byrd |
| 3,046,601 A | 7/1962 | Hubbert et al. |
| 3,385,367 A | 5/1968 | Kollsman |
| 4,445,694 A | 5/1984 | Flaherty |
| 4,612,985 A | 9/1986 | Rubbo et al. |
| 4,846,278 A | 7/1989 | Robbins |
| 5,139,235 A | 8/1992 | Kilmer |
| 5,163,321 A | 11/1992 | Perales |

(Continued)

FOREIGN PATENT DOCUMENTS

| | | |
|---|---|---|
| CA | 2751473 A1 | 8/2010 |
| CA | 2751473 C | 9/2014 |

(Continued)

OTHER PUBLICATIONS

International Search report and Written Opinion issued in related PCT/US2019/068493 dated Sep. 15, 2020.

(Continued)

*Primary Examiner* — Michael R Wills, III
(74) *Attorney, Agent, or Firm* — McGuireWoods LLP

(57) ABSTRACT

Liner hangers and methods of use. An example method includes positioning a liner hanger in a wellbore; the liner hanger comprising: two sealing elements disposed on the exterior of the liner hanger and having a void space therebetween, and a pressure reducing metal element disposed between the two sealing elements. The method further includes trapping a wellbore fluid in the void space; wherein the wellbore fluid thermally expands in the void space creating an annular pressure in the void space; and reducing the annular pressure by materially altering the pressure reducing metal element.

20 Claims, 5 Drawing Sheets

(56) References Cited

U.S. PATENT DOCUMENTS

| | | |
|---|---|---|
| 5,803,177 A | 9/1998 | Hriscu et al. |
| 6,098,717 A | 8/2000 | Bailey et al. |
| 6,321,861 B1 | 11/2001 | Leichter |
| 6,367,845 B1 | 4/2002 | Otten et al. |
| 6,640,893 B1 | 11/2003 | Rummel et al. |
| 6,695,061 B2 | 2/2004 | Fripp et al. |
| 7,007,910 B1 | 3/2006 | Krinner et al. |
| 7,040,404 B2 | 5/2006 | Brothers et al. |
| 7,387,158 B2 | 6/2008 | Murray et al. |
| 7,431,082 B2 | 10/2008 | Holt et al. |
| 7,562,704 B2 | 7/2009 | Wood et al. |
| 7,578,347 B2 | 8/2009 | Bosma et al. |
| 7,591,319 B2 | 9/2009 | Xu |
| 7,909,110 B2 | 3/2011 | Sharma et al. |
| 7,931,079 B2 | 4/2011 | Nicholson |
| 7,984,762 B2 | 7/2011 | Renshaw et al. |
| 8,083,000 B2 | 12/2011 | Nutley et al. |
| 8,434,571 B2 | 5/2013 | Kannan et al. |
| 8,443,881 B2 * | 5/2013 | Thomson .............. E21B 43/105 |
| | | 166/207 |
| 8,490,707 B2 | 7/2013 | Robisson et al. |
| 8,499,843 B2 | 8/2013 | Patel et al. |
| 8,776,899 B2 | 7/2014 | Fripp et al. |
| 9,033,046 B2 | 5/2015 | Andrew et al. |
| 9,091,133 B2 | 7/2015 | Stewart et al. |
| 9,133,683 B2 | 9/2015 | Dyer et al. |
| 9,404,030 B2 | 8/2016 | Mazyar et al. |
| 9,518,453 B2 * | 12/2016 | Dilber .................. E21B 43/103 |
| 9,605,508 B2 | 3/2017 | Xu et al. |
| 9,624,752 B2 | 4/2017 | Resink |
| 9,725,979 B2 | 8/2017 | Mazyar et al. |
| 9,745,451 B2 | 8/2017 | Zhao et al. |
| 9,856,710 B2 * | 1/2018 | Zhu ........................ E21B 33/03 |
| 9,869,152 B2 | 1/2018 | Gamstedt et al. |
| 9,976,380 B2 | 5/2018 | Davis et al. |
| 10,119,011 B2 | 11/2018 | Zhao et al. |
| 10,364,636 B2 | 7/2019 | Davis et al. |
| 10,428,624 B2 | 10/2019 | Vasques |
| 10,704,362 B2 | 7/2020 | Themig et al. |
| 10,851,615 B2 | 12/2020 | Watson et al. |
| 10,961,804 B1 | 3/2021 | Fripp et al. |
| 2002/0125008 A1 | 9/2002 | Wetzel et al. |
| 2003/0150614 A1 | 8/2003 | Brown et al. |
| 2004/0118572 A1 | 6/2004 | Whanger et al. |
| 2004/0149418 A1 | 8/2004 | Bosma et al. |
| 2004/0244994 A1 | 12/2004 | Jackson |
| 2005/0039927 A1 | 2/2005 | Wetzel et al. |
| 2005/0092485 A1 | 5/2005 | Brezinski |
| 2005/0199401 A1 | 9/2005 | Patel et al. |
| 2005/0257961 A1 | 11/2005 | Snell et al. |
| 2006/0175065 A1 | 8/2006 | Ross |
| 2007/0089911 A1 | 4/2007 | Moyes |
| 2007/0125532 A1 | 6/2007 | Murray et al. |
| 2007/0200299 A1 | 8/2007 | Kunz |
| 2007/0257405 A1 | 11/2007 | Freyer |
| 2008/0066931 A1 | 3/2008 | Xu |
| 2008/0149351 A1 | 6/2008 | Marya et al. |
| 2008/0185150 A1 | 8/2008 | Brown |
| 2008/0185158 A1 | 8/2008 | Chalker et al. |
| 2008/0220991 A1 | 9/2008 | Slay et al. |
| 2009/0120640 A1 | 5/2009 | Kulakofsky et al. |
| 2009/0130938 A1 | 5/2009 | Xu et al. |
| 2009/0173505 A1 | 7/2009 | Patel et al. |
| 2009/0179383 A1 | 7/2009 | Koloy et al. |
| 2009/0242189 A1 | 10/2009 | Vaidya et al. |
| 2009/0242214 A1 | 10/2009 | Foster et al. |
| 2009/0277651 A1 | 11/2009 | Kilgore |
| 2009/0277652 A1 | 11/2009 | Nutley et al. |
| 2010/0038074 A1 | 2/2010 | Patel |
| 2010/0163252 A1 | 7/2010 | Regnault De La Mothe et al. |
| 2010/0212891 A1 | 8/2010 | Stewart et al. |
| 2010/0270031 A1 | 10/2010 | Patel |
| 2010/0307770 A1 | 12/2010 | Sponchia et al. |
| 2011/0073310 A1 | 3/2011 | Clemens |
| 2011/0098202 A1 | 4/2011 | James et al. |
| 2011/0226374 A1 | 9/2011 | Kalman |
| 2011/0252879 A1 | 10/2011 | Madhavan et al. |
| 2012/0006530 A1 | 1/2012 | Crabb et al. |
| 2012/0055667 A1 | 3/2012 | Ingram et al. |
| 2012/0175134 A1 | 7/2012 | Robisson et al. |
| 2012/0205092 A1 * | 8/2012 | Givens ................ E21B 33/1208 |
| | | 166/118 |
| 2012/0292013 A1 | 11/2012 | Munshi et al. |
| 2012/0292023 A1 | 11/2012 | Hinkie et al. |
| 2013/0056196 A1 | 3/2013 | Hench |
| 2013/0056227 A1 | 3/2013 | Sponchia |
| 2013/0056228 A1 | 3/2013 | Gruetzmann et al. |
| 2013/0146312 A1 | 6/2013 | Gerrard et al. |
| 2013/0248179 A1 | 9/2013 | Yeh et al. |
| 2014/0051612 A1 | 2/2014 | Mazyar et al. |
| 2014/0054047 A1 | 2/2014 | Zhou |
| 2014/0060815 A1 | 3/2014 | Wang et al. |
| 2014/0238692 A1 | 8/2014 | Watson |
| 2014/0251641 A1 | 9/2014 | Marya et al. |
| 2014/0262351 A1 | 9/2014 | Derby |
| 2014/0318780 A1 | 10/2014 | Howard |
| 2014/0354443 A1 | 12/2014 | Roberson et al. |
| 2014/0361497 A1 | 12/2014 | Porta |
| 2015/0021044 A1 | 1/2015 | Davis et al. |
| 2015/0060064 A1 | 3/2015 | Lafferty et al. |
| 2015/0101813 A1 | 4/2015 | Zhao et al. |
| 2015/0199401 A1 | 7/2015 | Polehn et al. |
| 2015/0275644 A1 | 10/2015 | Chen et al. |
| 2015/0308214 A1 | 10/2015 | Bilansky et al. |
| 2015/0344772 A1 | 12/2015 | Droger et al. |
| 2015/0369027 A1 | 12/2015 | Jones et al. |
| 2016/0137912 A1 | 5/2016 | Sherman et al. |
| 2016/0138359 A1 | 5/2016 | Zhao et al. |
| 2016/0145965 A1 | 5/2016 | Zhao et al. |
| 2016/0194933 A1 | 7/2016 | O'Brien et al. |
| 2016/0201425 A1 | 7/2016 | Walton et al. |
| 2016/0215604 A1 | 7/2016 | Potapenko |
| 2016/0230495 A1 | 8/2016 | Mazyar et al. |
| 2016/0319633 A1 | 11/2016 | Cooper et al. |
| 2016/0376869 A1 | 12/2016 | Rochen et al. |
| 2016/0376870 A1 | 12/2016 | Roselier et al. |
| 2017/0191343 A1 | 7/2017 | Solhaug |
| 2017/0335673 A1 | 11/2017 | Burke et al. |
| 2018/0078998 A1 | 3/2018 | Sherman |
| 2018/0085154 A1 | 3/2018 | Kulper et al. |
| 2018/0087346 A1 * | 3/2018 | Rochen ................ E21B 43/103 |
| 2018/0087350 A1 | 3/2018 | Sherman |
| 2018/0266215 A1 | 9/2018 | Fagley, IV et al. |
| 2018/0355693 A1 | 12/2018 | Al-Abduljabbar et al. |
| 2019/0017285 A1 | 1/2019 | Kain |
| 2019/0055808 A1 | 2/2019 | Krueger |
| 2019/0128074 A1 | 5/2019 | Stokes et al. |
| 2019/0153852 A1 | 5/2019 | Lallemand et al. |
| 2019/0203101 A1 | 7/2019 | Dusterhoft et al. |
| 2019/0249509 A1 | 8/2019 | Jakkula et al. |
| 2019/0360297 A1 | 11/2019 | Heiman et al. |
| 2021/0017441 A1 | 1/2021 | Fripp et al. |
| 2021/0079756 A1 | 3/2021 | Ornelaz et al. |
| 2021/0140255 A1 | 5/2021 | Greci et al. |
| 2021/0189817 A1 | 6/2021 | Fripp et al. |
| 2021/0332659 A1 | 10/2021 | Fripp et al. |
| 2021/0353037 A1 | 11/2021 | Cote |
| 2022/0074221 A1 | 3/2022 | Laimbeer et al. |

FOREIGN PATENT DOCUMENTS

| | | |
|---|---|---|
| CN | 1708631 A | 12/2005 |
| CN | 102027189 A | 4/2011 |
| CN | 104583530 A | 4/2015 |
| CN | 105422146 A | 3/2016 |
| CN | 106522923 A | 3/2017 |
| CN | 107148444 A | 9/2017 |
| CN | 107250321 A | 10/2017 |
| CN | 107532466 A | 1/2018 |
| EP | 2399000 A2 | 12/2011 |
| FR | 3073549 A1 | 5/2019 |
| GB | 2381278 A | 4/2003 |
| GB | 2469723 A | 10/2010 |
| GB | 2514195 B | 6/2019 |

(56) References Cited

FOREIGN PATENT DOCUMENTS

| | | | |
|---|---|---|---|
| GB | 2583232 | A | 10/2020 |
| GB | 2557397 | B | 8/2021 |
| MX | 2011008597 | A | 9/2011 |
| RU | 2424419 | C1 | 7/2011 |
| RU | 2588501 | C2 | 6/2016 |
| RU | 182236 | U1 | 8/2018 |
| WO | 0026501 | A1 | 5/2000 |
| WO | 2008079486 | A1 | 7/2008 |
| WO | 2010096417 | A2 | 8/2010 |
| WO | 2012090056 | A2 | 7/2012 |
| WO | 2014098885 | A1 | 6/2014 |
| WO | 2014110382 | A1 | 7/2014 |
| WO | 2016171666 | A1 | 10/2016 |
| WO | 2018-005740 | A1 | 1/2018 |
| WO | 2018085102 | A1 | 5/2018 |
| WO | 2018147833 | A1 | 8/2018 |
| WO | 2019094044 | A1 | 5/2019 |
| WO | 2019147285 | A1 | 8/2019 |
| WO | 2019164492 | A1 | 8/2019 |
| WO | 2019164499 | A1 | 8/2019 |
| WO | 2020005252 | A1 | 1/2020 |
| WO | 2020018110 | A1 | 1/2020 |
| WO | 2021021203 | A1 | 2/2021 |
| WO | 2021076141 | A1 | 4/2021 |

OTHER PUBLICATIONS

International Search Report and Written Opinion dated Aug. 2, 2018, International PCT Application No. PCT/US2017/061307.
Search Report in FR Application No. 1859379, dated Oct. 15, 2019.
International Search Report and Written Opinion dated Nov. 19, 2018; International PCT Application No. PCT/US2018/019337.
Denmark Examination Report and Search Report dated Mar. 16, 2021, Denmark Application No. PA202070389.
International Search Report and Written Opinion dated Jul. 8, 2020, issued in related International Application No. PCT/US2019/056814.
International Search Report and Written Opinion for corresponding PCT International Application No. PCT/US2019/068497; dated Sep. 17, 2020.
International Search report and Written Opinion for corresponding International Patent Application No. PCT/US2019/062225, dated Aug. 11, 2020.
NEMISIS Annulus Swellable Packer, Weatherford, Swellable Products, 2009-2011.
Dutch Search Report issued in related NL 2026726, dated Aug. 13, 2021.
Written Opinion and Search Report in SG Appln No. 11202000316S, dated Aug. 30, 2021.
Dutch Search Report in NL Appln No. 2026737, dated Aug. 13, 2021.
Examination Report in GCC Appln No. GC 2020-39914, dated Jul. 29, 2021.
Office Action in CA Appln No. 3,070,929, dated Jul. 9, 2021.
International Search Report & Written Opinion in PCT/US2019/042074 dated Apr. 10, 2020.
Search Report in NL Appln No. 2025837, dated Sep. 23, 2021.
Office Action in CA Application No. 3,070,929 dated Nov. 19, 2021.
International Search Report & Written Opinion in PCT/US2019/017538, dated Nov. 11, 2019.
Chinese Search Report dated Dec. 17, 2021; CN Application No. 2018800875885.
Examination Report in GB Appln No. 2010931.0 dated Jan. 18, 2022.
International Search Report & Written Opinion in PCT/US2020/065539, dated Aug. 30, 2021.
International Search Report & Written Opinion in PCT/US2019/058904, dated Jul. 23, 2020.
French Search Report issued in FR Appln No. FR2006166, dated May 30, 2022.
International Search Report & Written Opinion in PCT/US2021/048628 dated May 19, 2022.
International Search Report & Written Opinion in PCT/US2021/027245 dated Jan. 10, 2022.
International Search Report and Written Opinion in PCT/US2021/032983, dated Feb. 10, 2022.
Netherlands Search Report in Application No. 2026573 dated Aug. 20, 2021.
Russian Office Action in RU Application No. 2021121198, dated Nov. 25, 2021.
GC Examination Report in GC Application No. 2019-38908, dated Nov. 4, 2020.
GC Examination Report in GC Application No. 2020-40475, dated Nov. 25, 2021.
MY Search Report in MY Application No. PI2020003430, dated May 26, 2022.
GB Examination Report in Application No. 2010931.0 dated Apr. 5, 2022.
DK Examination Report in Application No. PA 202070389, dated Oct. 20, 2021.

* cited by examiner

PRESSURE REDUCING METAL ELEMENTS FOR LINER HANGERS

TECHNICAL FIELD

The present disclosure relates to the use of pressure reducing metal elements, and more particularly, to the use of a metal element to reduce pressure against a liner hanger caused by the thermal expansion of wellbore fluids.

BACKGROUND

Geothermal wells may be drilled through a subterranean formation for the purpose of moving heat in a wide variety of surface and downhole applications. In some instances, a portion of the geothermal well may be cased by placing, and typically cementing, a casing into the wellbore. A tubing string may then be run in and out of the casing. Alternatively, the tubing string may be run in and out of any uncased portion of the wellbore as well.

In some operations, a liner may be suspended from a casing string or set cement layer with a liner hanger. The liner hanger anchors to the interior of the casing string or set cement layer and suspends the liner below the casing string or set cement layer. The suspended liner and the liner hanger do not extend to the surface as a casing string or set cement layer may. A liner hanger also forms a seal with the casing string or set cement layer to prevent fluid flow therein from outside of the suspended liner. Fluid flow is thus directed through the liner instead.

Metal sealing elements may be used with liner hangers in some wellbore applications, such as those applications servicing geothermal wells. Geothermal wells may have extreme temperatures (e.g., exceeding 350° F.) that may make it preferable to utilize metal sealing elements as they may better withstand these temperatures than some other species of sealing elements. Wellbore fluids, such as water, may become entrapped between the metal sealing elements on the exterior of the liner hanger. The thermal expansion of these wellbore fluids may increase pressure loading on the liner hanger. This thermal expansion may be of particular concern in geothermal wells and other wells having extreme temperatures. The present disclosure provides improved apparatus and methods for using liner hangers in wells having extreme temperatures.

BRIEF DESCRIPTION OF THE DRAWINGS

Illustrative examples of the present disclosure are described in detail below with reference to the attached drawing figures, which are incorporated by reference herein, and wherein.

Figure 1:
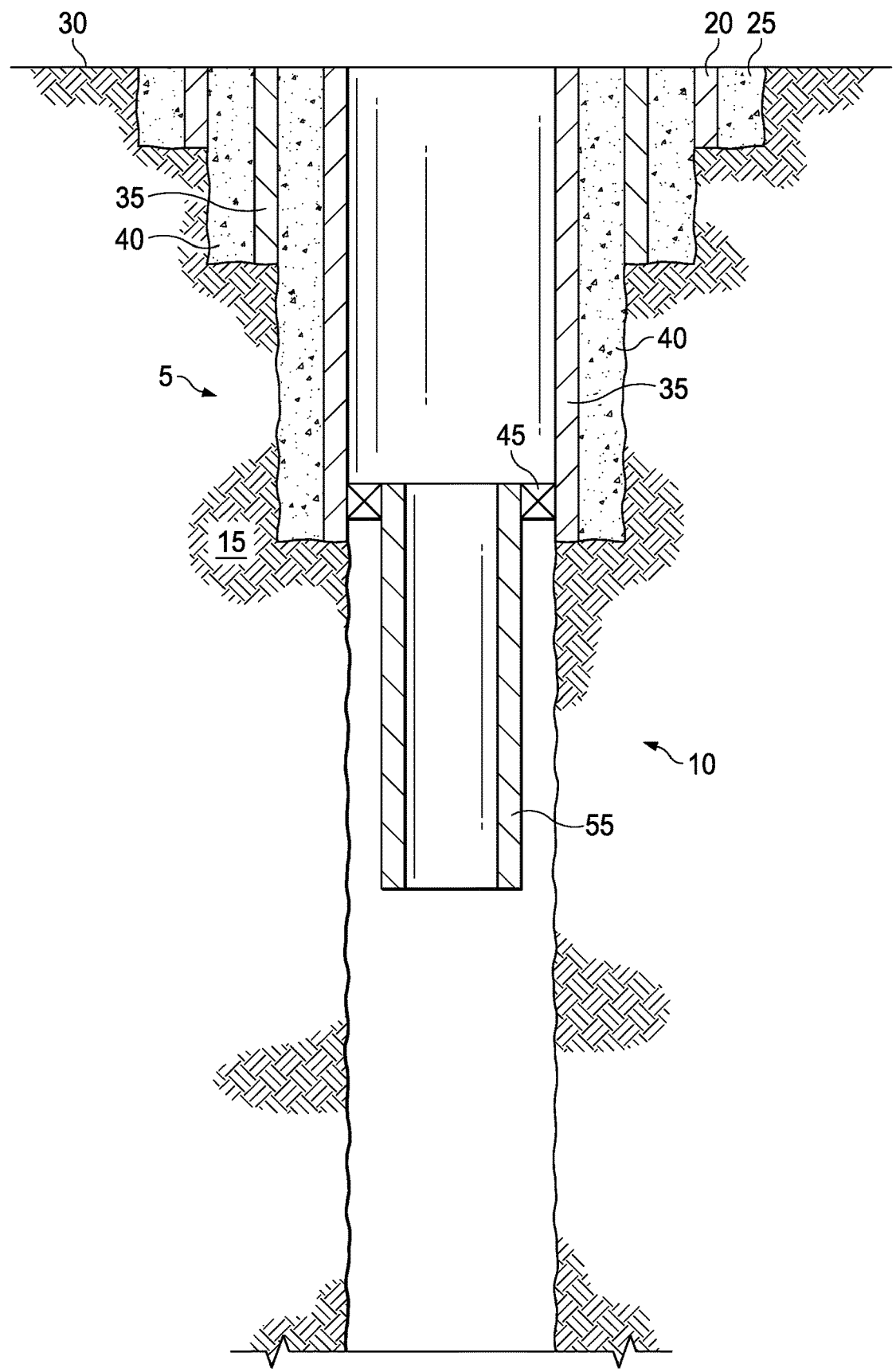
FIG. 1 is a schematic of an example tubing system for a geothermal well penetrating a subterranean formation in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates to the use of pressure reducing metal elements, and more particularly, to the use of a metal element to reduce pressure against a liner hanger caused by the thermal expansion of wellbore fluids.

In the following detailed description of several illustrative examples, reference is made to the accompanying drawings that form a part hereof, and in which is shown by way of illustration examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

Examples of the apparatus, methods, and systems described herein relate to the use of pressure reducing metal elements for liner hangers. The pressure reducing metal elements may be placed on the outer surface of the liner hanger and are disposed between the sealing elements. As used herein, "sealing elements" refers to any element used to form a seal. The pressure reducing metal elements may melt at wellbore temperatures, and the melted metal contracts in volume thereby providing additional volumetric space for the thermal expansion of any wellbore fluid trapped in the space between the sealing elements. Alternatively, the pressure reducing metal elements may react with the wellbore fluid (e.g., an aqueous fluid) and may produce a reaction product that occupies less volume than the combined volumes of the unreacted pressure reducing metal element and the wellbore fluid. The reaction product would thus provide additional volumetric space for the thermal expansion of any unreacted wellbore fluid. Advantageously, the pressure reducing metal elements may be usable at high wellbore temperatures such as those exceeding 350° F. As a further advantage, the pressure reducing metal elements may be usable when the wellbore fluids have a high-salinity. An additional advantage is that the pressure reducing metal elements comprise a wide variety of metals and metal alloys. Another additional advantage is that some examples, the pressure reducing metal elements may be used as backup sealing elements to supplement the overall sealing capabilities of the liner hanger. One other advantage is that the pressure reducing metal elements may be placed on an existing liner hanger without impact to or adjustment of the liner hanger's outer diameter or exterior profile.

The pressure reducing metal elements increase the volumetric space available for the thermal expansion of the wellbore fluid. In a specific example, water may expand 40% from a temperature increase of 250° F. to 650° F. Wellbore fluids, such as water, may become trapped between the sealing elements of the liner hanger. The thermal expansion of the water, induced by increasing wellbore temperature, may apply undesirable pressure to the sealing elements and the liner hanger.

The pressure reducing metal elements undergo a material alteration to provide additional volumetric space for any trapped wellbore fluid remaining after said material alteration. The material alteration may be a physical alteration such as a phase change or a chemical alteration such as the formation of a reaction product. In either example, the volumetric space available for thermal expansion of the remaining wellbore fluid is increased to allow the annular pressure within the sealed void space between sealing elements to be reduced.

In some examples, the pressure reducing metal elements comprise a phase changing metal. The metal may change phases from a solid to a liquid either through melting or through a galvanic reaction. Generally, examples of the phase changing metals include metals that contract when undergoing a phase change to the liquid phase. In some examples, the phase changing metal may be alloyed. The metal alloy may be non-eutectic or eutectic. If the alloy is non-eutectic, it may be hypoeutectic or hypereutectic. Examples of the phase changing metals include, but are not limited to, bismuth, antimony, gallium, lead, tin, manganese, cadmium, aluminum, iron, magnesium, nickel, beryllium, barium, zinc, or any combination or alloy. Preferred examples of alloys include, but are not limited to, alloys of bismuth, antimony, and gallium.

In some examples, the pressure reducing metal elements comprise a reactive metal that may react with the wellbore fluid to produce a reaction product having a smaller volume than the combined volume of the unreacted reactive metal and the wellbore fluid. Magnesium may be used to illustrate the overall volumetric reduction in occupied space as it undergoes reaction with water to form a metal hydroxide. Magnesium and water may have a volume of 52 to 66 $cm^3$ per mol depending on the temperature of the water. Magnesium hydroxide, the reaction product of magnesium and water, has a volume of 24.9 $cm^3$/mol. The volume of the reaction product is 38% to 48% of the volume of the unreacted magnesium and water. Any gas evolved from the reaction may escape into the wellbore, providing further space for additional thermal expansion. As another example, calcium and water may have a volume of 45 to 52 $cm^3$ per mol depending on the temperature of the water. Calcium hydroxide, the reaction product of calcium and water, has a volume of 34.4 $cm^3$/mol. The volume of the reaction product is 65% to 75% of the volume of the unreacted calcium and water. As a further example, aluminum and water may have a volume of 67 to 77 $cm^3$ per mol depending on the temperature of the water. Aluminum hydroxide, the reaction product of aluminum and water, has a volume of 26 $cm^3$/mol. The volume of the reaction product is 33% to 40% of the volume of the unreacted calcium and water.

Generally, the reactive metal may comprise any metal or metal alloy that undergoes a reaction to form a reaction product having a lesser volume than the combined volumes of the base reactive metal and the wellbore fluid. Examples of suitable reactive metals include, but are not limited to, magnesium, calcium, aluminum, tin, zinc, beryllium, barium, manganese, or any alloy or combination. Preferred metals include magnesium, calcium, and aluminum. Examples of suitable metal alloys for the reactive metal include, but are not limited to, alloys of magnesium, calcium, aluminum, tin, zinc, copper, beryllium, barium, manganese, zirconium, yttrium, neodymium, gadolinium, silver, tin, rhenium, or any combination. Preferred metal alloys include alloys of magnesium-zinc, magnesium-aluminum, calcium-magnesium, or aluminum-copper.

In some examples, the metal alloys of the reactive metal may comprise alloyed elements that are non-metallic. Examples of these non-metallic elements include, but are not limited to, graphite, carbon, silicon, boron nitride, and the like. In some examples, the metal is alloyed to increase reactivity and/or to control the formation of oxides.

In some examples, the metal alloys of the reactive metal are also alloyed with a dopant metal that promotes corrosion or inhibits passivation, thus increasing hydroxide formation. Examples of dopant metals include, but are not limited to, nickel, iron, copper, carbon, titanium, gallium, germanium, mercury, cobalt, iridium, gold, palladium, or any combination.

In some examples, the metals or metal alloys may comprise metals that are both phase-changing and reactive. The metal alloys may be formed in a solid solution process, a powder metallurgy process, or through any other method as would be apparent to one of ordinary skill in the art. Regardless of the method of manufacture, the pressure reducing metal element may be slipped over the liner hanger mandrel and held in place via any sufficient method. The pressure reducing metal element may be placed over the liner hanger mandrel in one solid piece or in multiple discrete pieces. Once in place, the pressure reducing metal element is held in position with end rings, stamped rings, retaining rings, set screws, or any other such method for retaining the pressure reducing metal element in position. As discussed above, the pressure reducing metal elements may be formed and shaped to fit over existing liner hangers and thus may not require modification of the outer diameter or profile of the liner hanger.

In some optional examples, the pressure reducing metal elements may be manufactured to include voids which may increase the available room for thermal expansion as the pressure reducing metal element changes phases or reacts with the wellbore fluid. In other optional examples, hollow crushable materials (e.g., glass microspheres) may be added to the pressure reducing metal elements as part of their manufacture. The hollow crushable materials may crush upon exceeding a pressure threshold. The occupied volume of the hollow crushable materials is mostly air. Crushing the hollow crushable materials would thus increase the available volume for thermal expansion of the wellbore fluid. In some optional examples, the pressure reducing metal elements may be manufactured to have a closed-cell structure that may increase the available room for thermal expansion as the pressure reducing metal element changes phases or reacts with the wellbore fluid.

In some examples, the pressure reducing metal elements may be used to supplement the seal formed by the sealing elements. If the pressure reducing metal element comprises a reactive metal, the reaction product (e.g., a metal hydroxide) may solidify after reaction and form a hardened, cementitious-like material, which may prevent passage of the wellbore fluid across the solid reaction product. The reaction product may also supplement the anchoring ability of the sealing elements of the liner hanger. If the pressure reducing metal element comprises a phase-changing metal, the liquid metal may resolidify in such a position to prevent passage of the wellbore fluid across the solid metal. The solid metal may also supplement the anchoring ability of the sealing elements of the liner hanger.

Generally, the wellbore fluids that may thermally expand in the wellbore are aqueous-based fluids. These wellbore fluids include, but are not limited to, saltwater (e.g., water containing one or more salts dissolved therein), brine (e.g., saturated saltwater, which may be produced from subterranean formations), seawater, or any combination thereof. In the case of saltwater, brines, and seawater, the wellbore fluid may comprise a monovalent salt or a divalent salt. Monovalent salts may include, for example, sodium chloride salt, sodium bromide salt, potassium chloride salt, potassium bromide salt, and the like. Divalent salt can include, for example, magnesium chloride salt, calcium chloride salt, calcium bromide salt, and the like. In some examples, the salinity of the wellbore fluid may exceed 10%. Advantageously, the pressure reducing metal elements of the present disclosure may not be impacted by contact with high-salinity fluids.

The pressure reducing metal elements may be used in high-temperature formations, for example, in formations with zones having temperatures equal to or exceeding 350° F. In some examples, the pressure reducing metal elements may be used in both high-temperature formations and with high-salinity wellbore fluids. Although this disclosure makes reference to geothermal wells due to their extreme temperatures, it is to be understood that the teachings of this disclosure are not limited to geothermal applications and may be applied to any well, and particularly those having temperatures equal to or exceeding 350° F. or any such well in which wellbore fluids may be susceptible to undesirable thermal expansion.

FIG. 1 is a schematic of an example tubing system, generally 5, for a geothermal well 10 penetrating a subterranean formation 15. The tubing system 5 comprises a surface casing 20 and a surface cement sheath 25 descending from the surface 30. Tubing system 5 further comprises two layers of intermediate casing 35 and intermediate cement sheaths 40 that are deployed and nested concentrically within the surface casing 20. In some examples, only one layer of intermediate casing 35 may be used. In some examples, a shallow well may be drilled which may not utilize a layer of intermediate casing 35. A liner hanger 45 is deployed within the innermost intermediate casing 35. The liner hanger 45 may be used to suspend a liner 55 from within the previous casing (i.e., innermost intermediate casing 35). The liner 55 may be any conduit suitable for suspension within the geothermal well 10. The liner 55 is a conduit that does not run to the surface 30 like the intermediate casing strings 35 do. The liner hanger 45 seals within the intermediate casing 35 allowing the liner 55 to functionally act as an extension of the intermediate casing 35.

Figure 2:
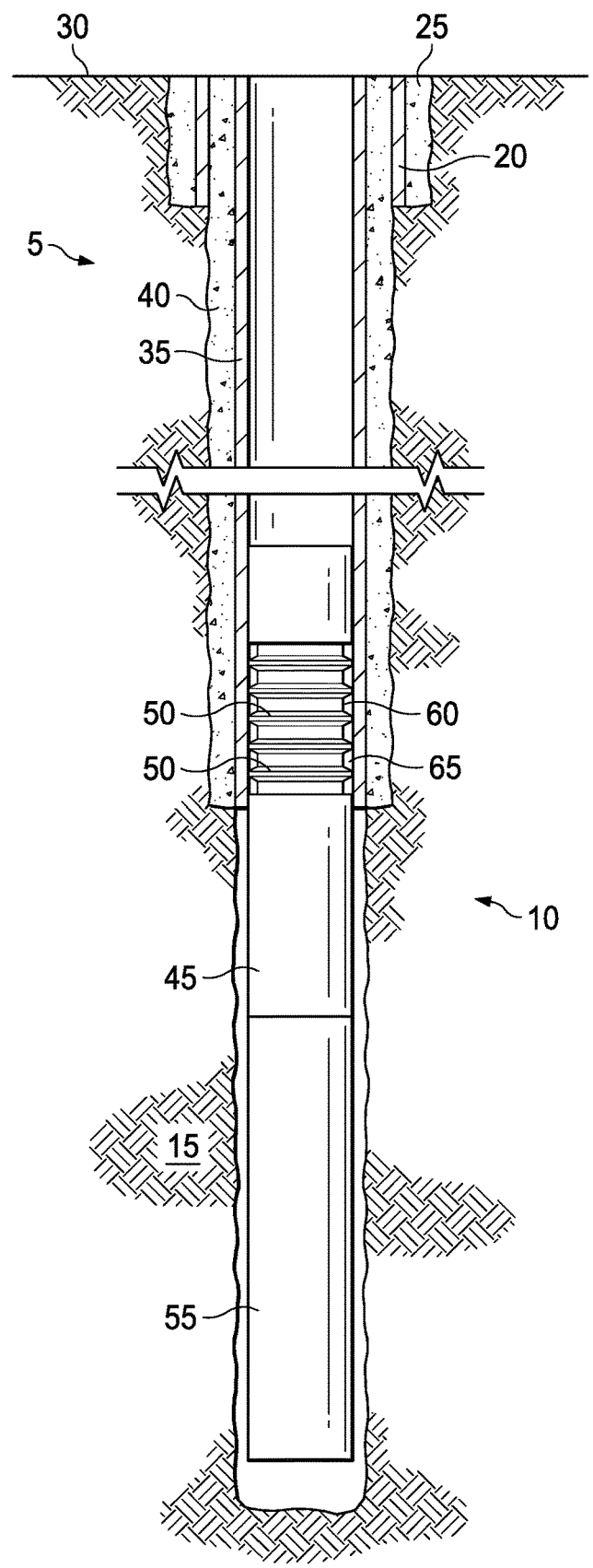
FIG. 2 is an enlarged cross-section illustrating the example tubing system of FIG. 1 in accordance with the examples disclosed herein.

FIG. 2 is an enlarged cross-section illustration of the example tubing system 5 of FIG. 1. Tubing system 5 functions as a conduit for the geothermal well 10 that penetrates subterranean formation 15. The tubing system 5 comprises a surface casing 20 and a surface cement sheath 25 that anchors the surface casing 20 in the wellbore. Surface casing 20 extends from the surface 30 down to a desired depth in the geothermal well 10. Intermediate casing 35 is deployed concentrically within surface casing 20. Intermediate casing 35 may be held in place within the surface casing 20 with an intermediate cement sheath 40. Although only one layer of intermediate casing 35 is illustrated, it is to be understood that as many layers of intermediate casing 35 may be used as desired. Any subsequent layers of the intermediate casing 35 may be nested concentrically within one another within the illustrated intermediate casing 35. The liner hanger 45 is deployed within the intermediate casing 35. The liner hanger 45 suspends a liner 55 from its end. The liner hanger 45 is anchored to the intermediate casing 35 with a series of sealing elements 50. The sealing elements 50 form external seals with the adjacent interior surface of the intermediate casing 35. The formed seals prevent wellbore fluid from bypassing the liner 55 and liner hanger 45. The pressure reducing metal elements 60 may be positioned in-between the sealing elements 50 to reduce pressure from wellbore fluids trapped in any voids 65 between the sealing elements 50 and the adjacent interior surface of the intermediate casing 35.

It should be clearly understood that the examples illustrated by FIGS. 1-2 are merely general applications of the principles of this disclosure in practice, and a wide variety of other examples are possible. Therefore, the scope of this disclosure is not limited in any manner to the details of any of the FIGURES described herein.

Figure 3:
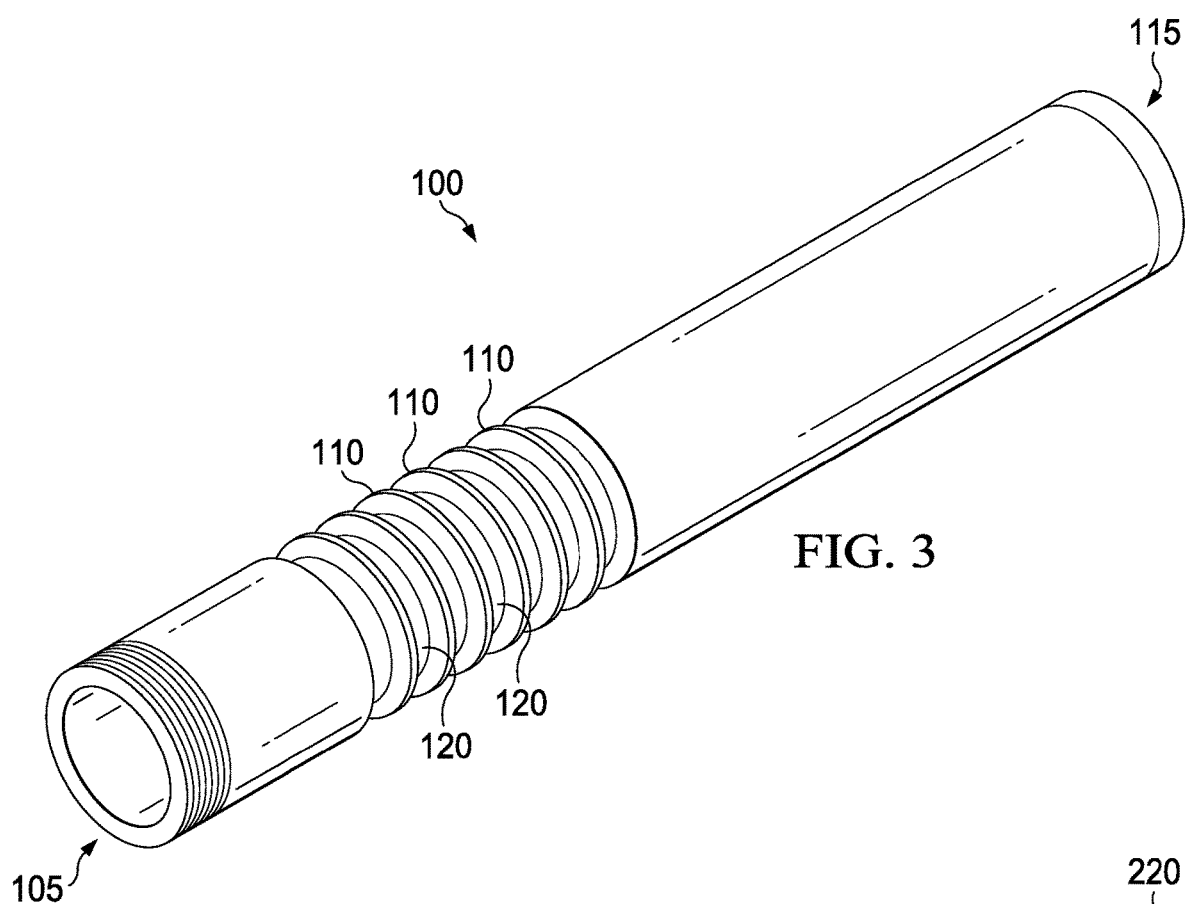
FIG. 3 is an isometric illustration of an example liner hanger in accordance with the examples disclosed herein.

FIG. 3 is an isometric illustration of an example of a liner hanger, generally 100. The liner hanger 100 couples to and forms a seal inside the previous casing at the coupling end 105. The sealing elements 110 form external seals to seal against the surface of the previous casing and anchor the liner hanger 100 to the previous casing or set cement layer. In some examples, the sealing elements 110 are metal sealing elements and form metal-to-metal seals or metal-to-cement seals. In other examples, the sealing elements 110 may be non-metal sealing elements. A liner (not illustrated) may be coupled to and suspended from the suspending end 115. Pressure reducing metal elements 120 may be positioned in-between the sealing elements 110 to reduce pressure from the thermal expansion of any wellbore fluids trapped in any voids (e.g., voids 65 as illustrated in FIG. 2) formed between the sealing elements 110 and the adjacent interior surface of the previous casing or set cement layer. As described above, the pressure reducing metal elements 120 reduce the pressure in the voids by providing additional volumetric space in which the trapped wellbore fluids may thermally expand.

It should be clearly understood that the example illustrated by FIG. 3 is merely a general application of the principles of this disclosure in practice, and a wide variety of other examples are possible. Therefore, the scope of this disclosure is not limited in any manner to the details of any of the FIGURES described herein.

Figure 4:
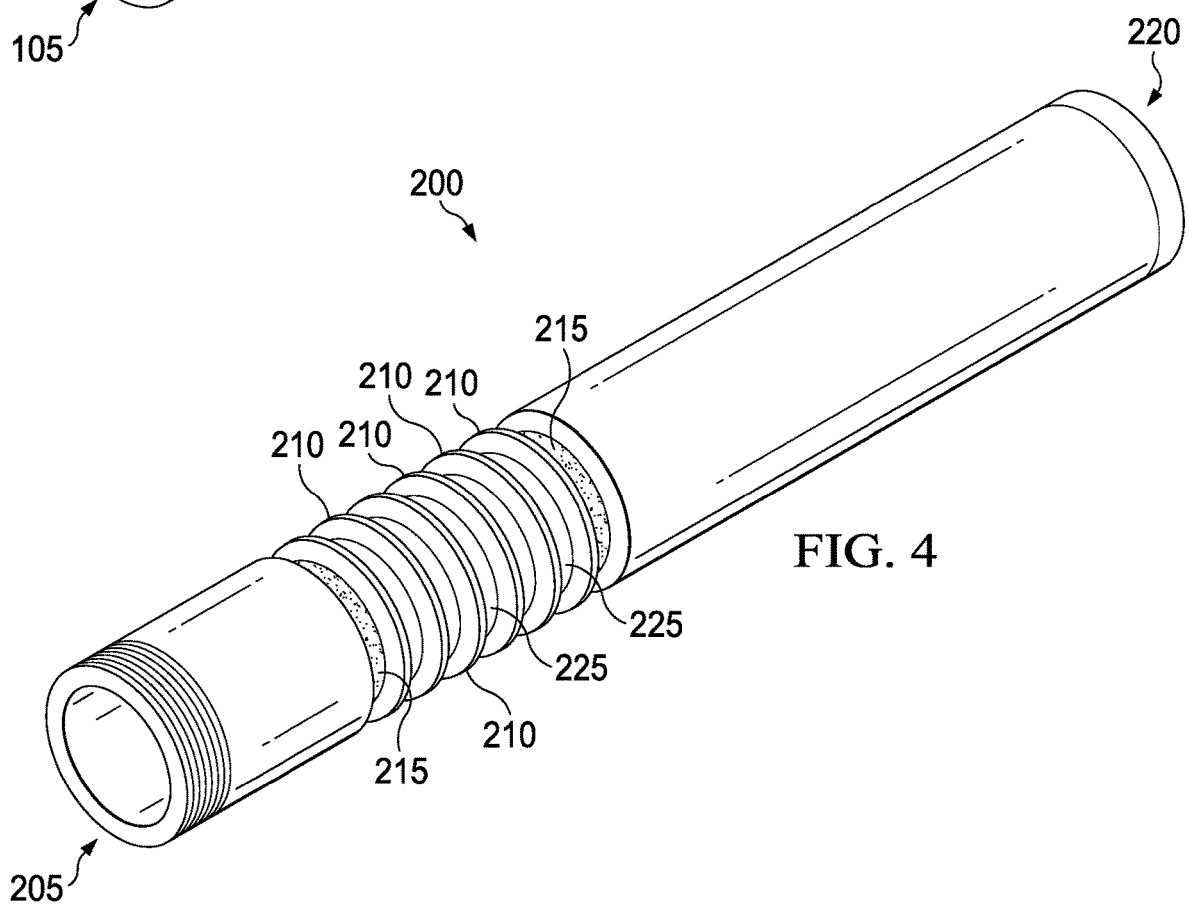
FIG. 4 is an isometric illustration of another example of a liner hanger in accordance with the examples disclosed herein.

FIG. 4 is an isometric illustration of another example of a liner hanger, generally 200. The liner hanger 200 couples to and forms a seal inside the previous casing at the coupling end 205. The metal sealing elements 210 form external seals to seal against the surface of the previous casing or set cement layer and anchor the liner hanger 200 to the previous casing or set cement layer. Non-metal sealing elements 215 may be disposed proximate to the metal sealing elements 210 to form seals against the previous casing or set cement layer. A liner (not illustrated) may be coupled to and suspended from the suspending end 220. Pressure reducing metal elements 225 may be positioned in-between the metal sealing elements 210 and/or the non-metal sealing elements 215 to reduce pressure from the thermal expansion of any wellbore fluids trapped in any voids (e.g., voids 65 as illustrated in FIG. 2) formed between the metal sealing elements 210 and/or the non-metal sealing elements 215 and the adjacent interior surface of the previous casing or cement sheath. As described above, the pressure reducing metal elements 225 reduce the pressure in the voids by providing additional volumetric space in which the trapped wellbore fluids may thermally expand.

Although FIG. 4 illustrates two non-metal sealing elements 215 individually placed on the ends of a series of metal sealing elements 210, it is to be understood that any number of non-metal sealing elements 215 may be used, and that the non-metal sealing elements 215 may be placed in any sequence or series with the metal sealing elements 210 as desired.

The non-metal sealing elements 215 may be any species of sealing element. The non-metal sealing elements 215 may comprise any oil-swellable, water-swellable, and/or combination of swellable non-metal material as would occur to one of ordinary skill in the art. A specific example of a swellable non-metal material is a swellable elastomer. The swellable non-metal sealing elements 215 may swell when exposed to a swell-inducing fluid (e.g., an oleaginous or aqueous fluid). Generally, the non-metal sealing elements 215 may swell through diffusion whereby the swell-inducing fluid is absorbed into the structure of the non-metal sealing elements 215 where a portion of the swell-inducing fluid may be retained. The swell-inducing fluid may continue to diffuse into the swellable non-metal sealing elements 215 causing the non-metal sealing elements 215 to swell until they contact an adjacent surface. The non-metal sealing elements 215 may work in tandem with the metal sealing elements 210 to create a differential annular seal around the liner hanger 200.

It should be clearly understood that the example illustrated by FIG. 4 is merely a general application of the principles of this disclosure in practice, and a wide variety of other examples are possible. Therefore, the scope of this disclosure is not limited in any manner to the details of any of the FIGURES described herein.

Figure 5A:
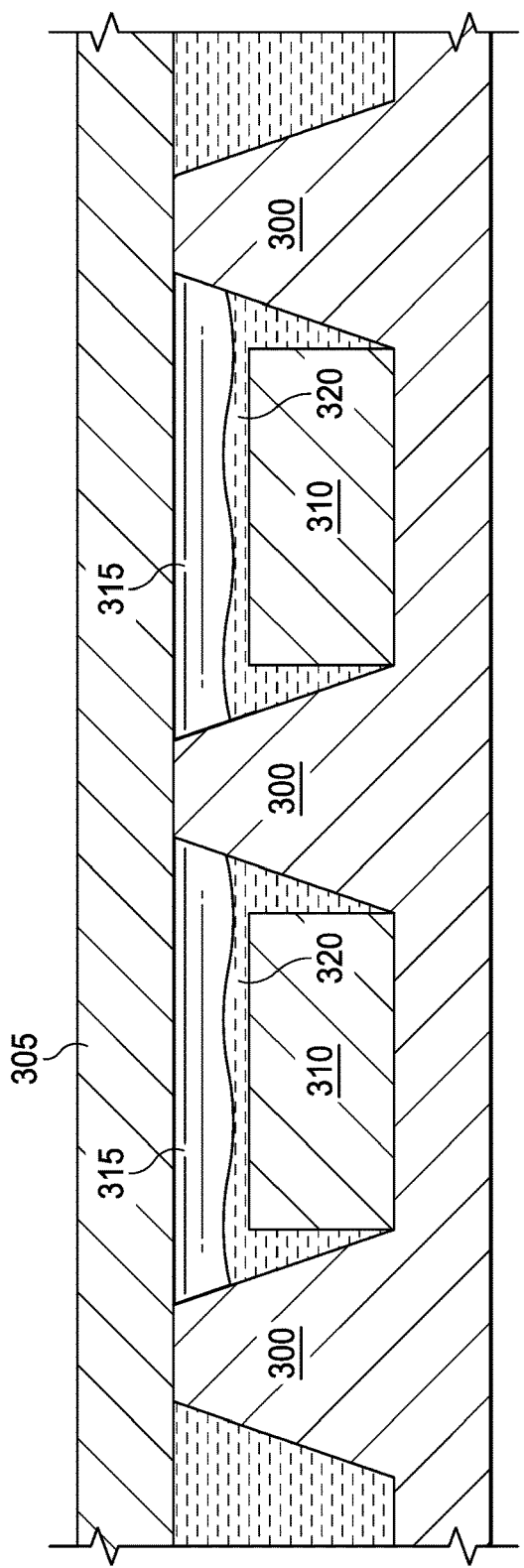
FIG. 5A is an enlarged cross-section of the sealing elements of a liner hanger after sealing and anchoring to a casing in a wellbore in accordance with the examples disclosed herein.

FIG. 5A is an enlarged cross-section of the sealing elements 300 of a liner hanger after sealing and anchoring to a casing 305 in a wellbore. A pressure reducing metal element 310 is disposed in the void space 315 between adjacent sealing elements 300. In some well operations, a wellbore fluid 320 may become trapped in the void space 315 after the sealing elements 300 have formed the seal around the exterior of the liner hanger. This wellbore fluid 320 may be unable to escape from the enclosed void space 315 once sealed. In a well with a very high downhole temperature, such as a geothermal well, the wellbore fluid 320 may thermally expand. The thermal expansion of the wellbore fluid 320 may increase pressure within the void space 315. Increased pressure within the void space 315 may impact the integrity of the formed seal and anchoring performed by the sealing elements 300. In their initial state, the pressure reducing metal elements 310 reduce the volumetric space available within the void space 315 for wellbore fluids to reside. The pressure reducing metal elements 310 may thus limit the amount of wellbore fluid 320 that may be trapped in void space 315.

With continued reference to FIG. 5A, the pressure reducing metal elements 310 are illustrated in their initial state before they have reduced the pressure in the void space 315. The pressure reducing metal elements 310 comprise a phase-changing metal. The pressure reducing metal elements 310 may be placed within void space 315 and held in place with end rings, stamped rings, retaining rings, set screws of any such method for retaining the pressure reducing metal element in position. The composition of the pressure reducing metal elements 310 may be selected so as to induce melting at a specific threshold temperature or a galvanic reaction.

Figure 5B:
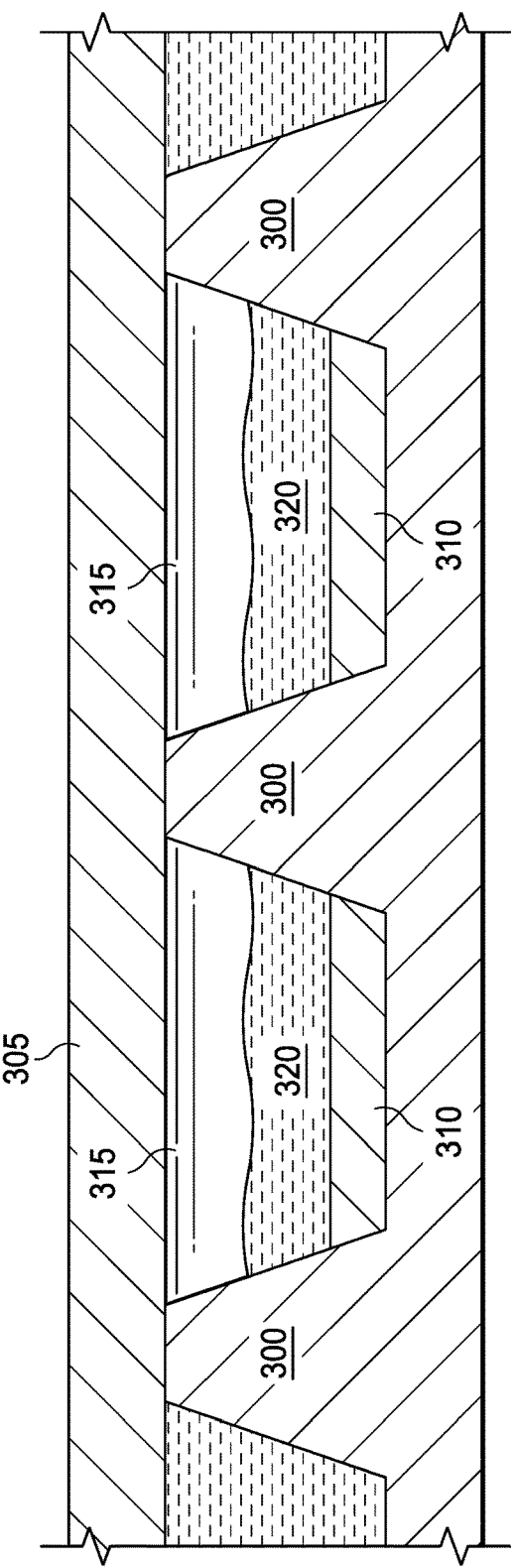
FIG. 5B is an enlarged cross-section of the sealing elements of a liner hanger after the pressure reducing metal elements have reduced the pressure within the space between the sealing elements in accordance with the examples disclosed herein.

FIG. 5B is an enlarged cross-section of the sealing elements 300 of a liner hanger after the pressure reducing metal elements 310 have reduced the pressure within the void space 315. In the illustrated example, the pressure reducing metal elements 310 have melted or galvanically reacted, and this phase change produces a liquid that occupies less volume within the void space 315. This phase change of the pressure reducing metal element 310 may occur when the temperature within the wellbore exceeds the melting temperature of the pressure reducing metal element 310 or when the pressure reducing metal element 310 has galvanically reacted. After the pressure reducing metal element 310 has changed phases, the wellbore fluid 320 trapped within the void space 315 would be provided additional volumetric space for thermal expansion. The additional volumetric space provided by the pressure reducing metal element 310 allows for the pressure within void space 315 to be reduced as the wellbore fluid 320 thermally expands within the void space 315.

In some examples, the liquid pressure reducing metal elements 310 may resolidify and supplement the seal provided by the sealing elements 300 should the geometry of the void space 315 be conducive for a portion of the resolidified metal to contact the external surfaces of the previous casing and the liner hanger such that there exists a pressure differential across the resolidified metal.

It should be clearly understood that the examples illustrated by FIGS. 5A-5B are merely general applications of the principles of this disclosure in practice, and a wide variety of other examples are possible. Therefore, the scope of this disclosure is not limited in any manner to the details of any of the FIGURES described herein.

Figure 6A:
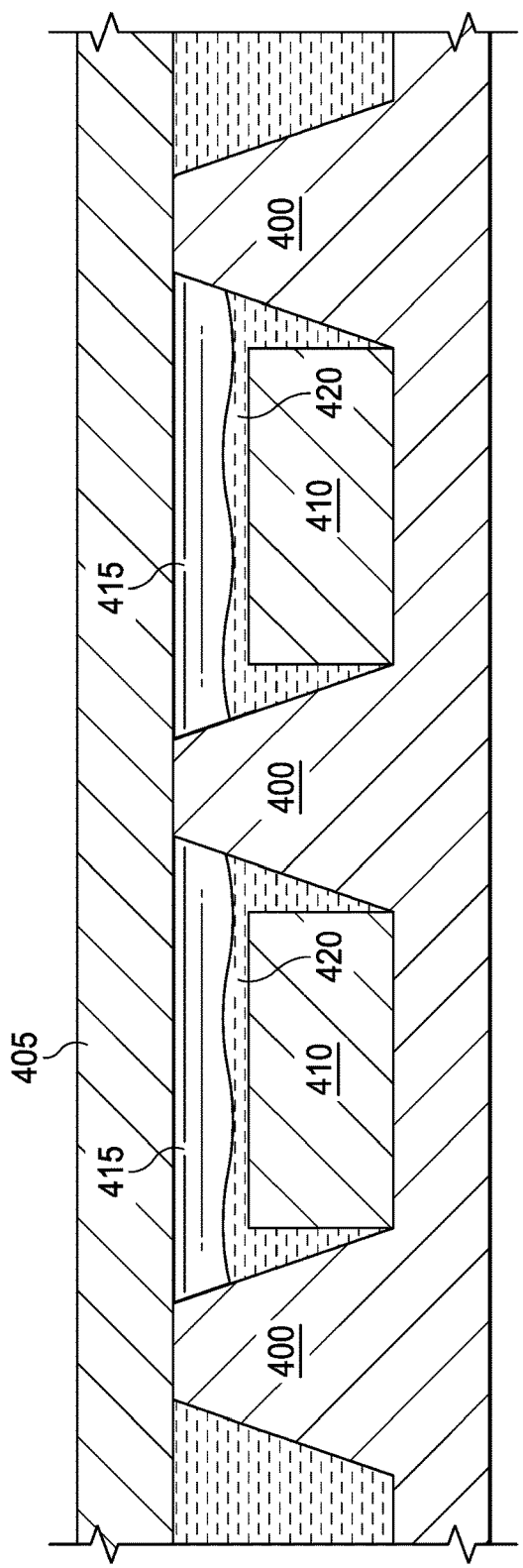
FIG. 6A is an enlarged cross-section of the sealing elements of a liner hanger after sealing and anchoring to a casing in a wellbore in accordance with the examples disclosed herein.

FIG. 6A is an enlarged cross-section of the sealing elements 400 of a liner hanger after sealing and anchoring to a casing 405 in a wellbore. A pressure reducing metal element 410 is disposed in the void space 415 between the adjacent sealing elements 400. In some well operations, a wellbore fluid 420 may become trapped in the void space 415 after the sealing elements 400 have formed the seal around the exterior of the liner hanger. This wellbore fluid 420 may be unable to escape from the enclosed void space 415 once sealed. In a well with a very high downhole temperature, such as a geothermal well, the wellbore fluid 420 may thermally expand. The thermal expansion of the wellbore fluid 420 may increase the pressure within the void space 415. Increased pressure within the void space 415 may impact the integrity of the seal and anchoring performed by the sealing elements 400. In their initial state, the pressure reducing metal elements 410 reduce the volumetric space available within the void space 415 for the wellbore fluid 420 to reside. The pressure reducing metal elements 410 may thus limit the amount of wellbore fluid 420 which may be trapped in the void space 415.

With continued reference to FIG. 6A, the pressure reducing metal elements 410 are illustrated in their initial state before they have reduced the pressure in the void space 415. The pressure reducing metal elements 410 comprise reactive metals. The pressure reducing metal elements 410 may be placed within the void space 415 and held in place with end rings, stamped rings, retaining rings, set screws of any such method for retaining the pressure reducing metal element 410 in position. The composition of the pressure reducing metal elements 410 may be selected so as to react with the wellbore fluid 420 to produce a reaction product that occupies less volume than the combined volumes of the wellbore fluid 420 and the pressure reducing metal element 410.

Figure 6B:
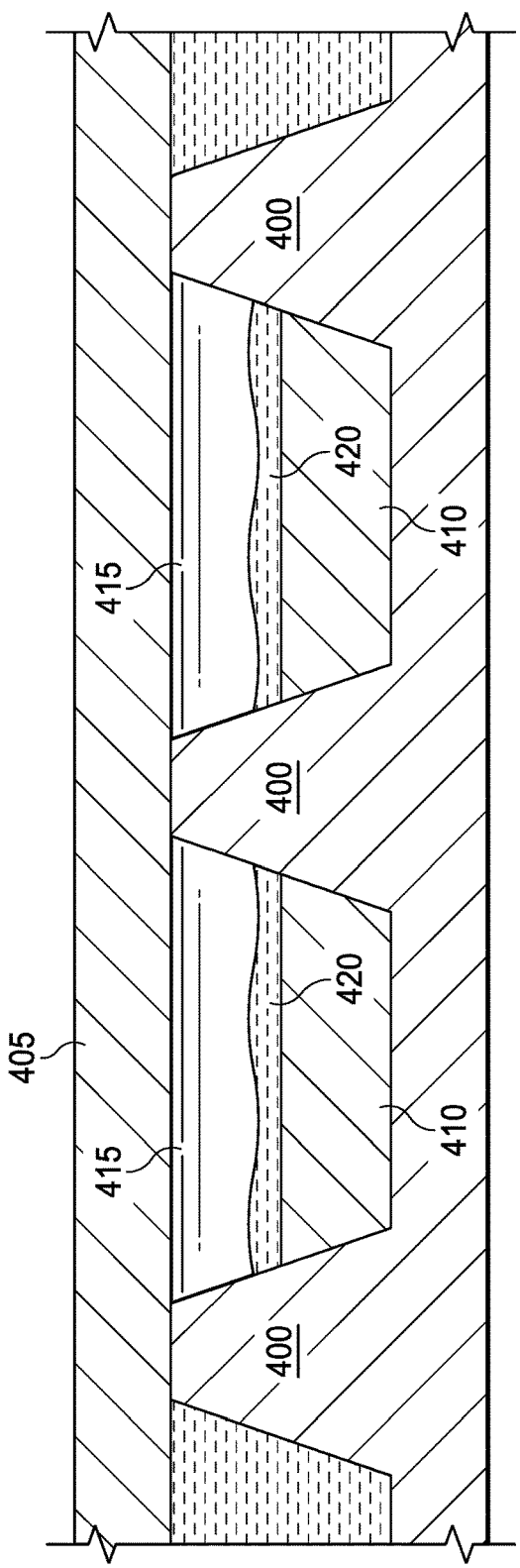
FIG. 6B is an enlarged cross-section of the sealing elements of a liner hanger after the pressure reducing metal elements have reduced the pressure within the space between the sealing elements in accordance with the examples disclosed herein.

FIG. 6B is an enlarged cross-section of the sealing elements 400 of a liner hanger after the pressure reducing metal elements 410 have reduced the pressure within the void space 415. In the illustrated example, the pressure reducing metal elements 410 have reacted with the wellbore fluid 420. The reaction product produced from this reaction occupies less volume within the void space 415 than the combined volumes of the unreacted wellbore fluid 420 and the pressure reducing metal elements 410. Thus, any unreacted wellbore fluid 420 would be provided additional volumetric space for thermal expansion. This additional volumetric space provided by the pressure reducing metal element 410 allows for the pressure within the void space 415 to be reduced as the remaining wellbore fluid thermally expands within the void space 415.

In some examples, the reaction product of the pressure reducing metal elements 410 and the wellbore fluid 420 may supplement the seal provided by the sealing elements 400 should the amount of reaction product formed and the geometry of the void space 415 be conducive for a portion of the reaction product to contact the external surfaces of the previous casing and the liner hanger such that there exists a pressure differential across the formed reaction product.

It should be clearly understood that the examples illustrated by FIGS. 6A-6B are merely general applications of the principles of this disclosure in practice, and a wide variety of other examples are possible. Therefore, the scope of this disclosure is not limited in any manner to the details of any of the FIGURES described herein.

It is also to be recognized that the disclosed liner hangers may also directly or indirectly affect the various downhole equipment and tools that may come into contact with the liner hangers during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in any of the FIGURES.

Provided are liner hangers for suspending a liner in a wellbore in accordance with the disclosure and the illustrated FIGURES. An example liner hanger comprises two sealing elements disposed on the exterior of the liner hanger, and a pressure reducing metal element disposed between the two sealing elements.

Additionally or alternatively, the liner hangers may include one or more of the following features individually or in combination. The pressure reducing metal element may comprise a metal selected from the group consisting of bismuth, antimony, gallium, lead, tin, manganese, cadmium, aluminum, iron, magnesium, nickel, beryllium, barium, zinc, calcium, tin, copper, zirconium, yttrium, neodymium, gadolinium, silver, rhenium, any alloy thereof, and any combination thereof. The pressure reducing metal element may comprise a metal alloy having at least one alloyed metal selected from the group consisting of bismuth, antimony, gallium, aluminum, calcium, magnesium, and any combination thereof. The pressure reducing metal element may be manufactured to include voids within the pressure reducing metal element. The pressure reducing metal may further comprise a hollow crushable material.

Provided are methods for reducing the annular pressure around a liner hanger in a wellbore in accordance with the disclosure and the illustrated FIGURES. An example method comprises positioning a liner hanger in a wellbore; the liner hanger comprising: two sealing elements disposed on the exterior of the liner hanger and having a void space therebetween, and a pressure reducing metal element disposed between the two sealing elements. The method further comprises trapping a wellbore fluid in the void space;

wherein the wellbore fluid thermally expands in the void space creating an annular pressure in the void space; and reducing the annular pressure by materially altering the pressure reducing metal element.

Additionally or alternatively, the method may include one or more of the following features individually or in combination. Materially altering the pressure reducing metal element may further comprise changing the phase of the pressure reducing metal element. Changing the phase of the pressure reducing metal element may further comprise melting the pressure reducing metal element. Changing the phase of the pressure reducing metal element may further comprise galvanically reacting the pressure reducing metal element. Materially altering the pressure reducing metal element may further comprise reacting the pressure reducing metal element with the wellbore fluid. The pressure reducing metal element may comprise a metal selected from the group consisting of bismuth, antimony, gallium, lead, tin, manganese, cadmium, aluminum, iron, magnesium, nickel, beryllium, barium, zinc, calcium, tin, copper, zirconium, yttrium, neodymium, gadolinium, silver, rhenium, any alloy thereof, and any combination thereof. The pressure reducing metal element may comprise a metal alloy having at least one alloyed metal selected from the group consisting of bismuth, antimony, gallium, aluminum, calcium, magnesium, and any combination thereof. The pressure reducing metal element may be manufactured to include voids within the pressure reducing metal element. The pressure reducing metal element may further comprise a hollow crushable material. The wellbore may be a wellbore of a geothermal well.

Provided are liner hanger systems for suspending a liner in a wellbore in accordance with the disclosure and the illustrated FIGURES. An example system comprises two sealing elements disposed on the exterior of the liner hanger, and a pressure reducing metal element disposed between the two sealing elements. The system further comprises the liner coupled to a first end of the liner hanger, and a conduit connected to a second end of the liner hanger.

Additionally or alternatively, the system may include one or more of the following features individually or in combination. The pressure reducing metal element may comprise a metal selected from the group consisting of bismuth, antimony, gallium, lead, tin, manganese, cadmium, aluminum, iron, magnesium, nickel, beryllium, barium, zinc, calcium, tin, copper, zirconium, yttrium, neodymium, gadolinium, silver, rhenium, any alloy thereof, and any combination thereof. The pressure reducing metal element may be manufactured to include voids and/or a hollow crushable material within the pressure reducing metal element. The conduit may be a casing or a layer of set cement. The wellbore may be the wellbore of a geothermal well.

The preceding description provides various examples of the apparatus, systems, and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for reducing the annular pressure around a liner hanger, the method comprising:
    positioning a liner hanger in a wellbore, the liner hanger comprising:
        two sealing elements disposed on the exterior of the liner hanger and having a void space therebetween, and
        a pressure reducing metal element disposed between the two sealing elements;
    trapping a wellbore fluid in the void space, wherein the wellbore fluid thermally expands in the void space creating an annular pressure in the void space; and
    reducing the annular pressure by materially altering the pressure reducing metal element.

2. The method of claim 1, wherein the materially altering the pressure reducing metal element comprises changing the phase of the pressure reducing metal element.

3. The method of claim 2, wherein the changing the phase of the pressure reducing metal element comprises melting the pressure reducing metal element.

4. The method of claim 2, wherein the changing the phase of the pressure reducing metal element comprises galvanically reacting the pressure reducing metal element.

5. The method of claim 1, wherein the materially altering the pressure reducing metal element comprises reacting the pressure reducing metal element with the wellbore fluid.

6. The method of claim 1, wherein the pressure reducing metal element comprises a metal selected from the group consisting of bismuth, antimony, gallium, lead, tin, manganese, cadmium, aluminum, iron, magnesium, nickel, beryllium, barium, zinc, calcium, tin, copper, zirconium, yttrium, neodymium, gadolinium, silver, rhenium, any alloy thereof, and any combination thereof.

7. The method of claim 1, wherein the pressure reducing metal element comprises a metal alloy having at least one alloyed metal selected from the group consisting of bismuth, antimony, gallium, aluminum, calcium, magnesium, and any combination thereof.

8. The method of claim 1, wherein the pressure reducing metal element is manufactured to include voids within the pressure reducing metal element.

9. The method of claim 1, wherein the pressure reducing metal element further comprises a hollow crushable material.

10. The method of claim 1, wherein the wellbore is a wellbore of a geothermal well.

11. A liner hanger for suspending a liner, the liner hanger comprising:
two sealing elements disposed on the exterior of the liner hanger and having a void space therebetween; and
a pressure reducing metal element disposed in the void space between the two sealing elements; wherein the pressure reducing metal element comprises a metal alloy having at least one alloyed metal selected from the group consisting of bismuth, antimony, gallium, aluminum, calcium, magnesium, and any combination thereof wherein the pressure reducing metal element is configured to be materially altered to reduce annular pressure within the void space; wherein the material alteration is a chemical reaction induced by a reaction with a fluid trapped within the void space.

12. The liner hanger of claim 11, wherein the metal alloy further comprises lead, tin, manganese, cadmium, iron, nickel, beryllium, barium, zinc, copper, zirconium, yttrium, neodymium, gadolinium, silver, rhenium and any combination thereof.

13. The liner hanger of claim 11, wherein the pressure reducing metal element is manufactured to include voids within the pressure reducing metal element.

14. The liner hanger of claim 11, wherein the pressure reducing metal further comprises a hollow crushable material.

15. A liner hanger system for suspending a liner in a wellbore, the system comprising:
a liner hanger comprising:
two sealing elements disposed on the exterior of the liner hanger and having a void space therebetween, and
a pressure reducing metal element disposed in the void space between the two sealing elements, wherein the pressure reducing metal element is manufactured to include voids and/or a hollow crushable material within the pressure reducing metal element; wherein the pressure reducing metal element is configured to be materially altered to reduce annular pressure within the void space; wherein the material alteration is a chemical reaction induced by a reaction with a fluid trapped within the void space;
the liner coupled to a first end of the liner hanger; and
a conduit connected to a second end of the liner hanger.

16. The system of claim 15, wherein the pressure reducing metal element comprises a metal selected from the group consisting of bismuth, antimony, gallium, lead, tin, manganese, cadmium, aluminum, iron, magnesium, nickel, beryllium, barium, zinc, calcium, tin, copper, zirconium, yttrium, neodymium, gadolinium, silver, rhenium, any alloy thereof, and any combination thereof.

17. The system of claim 15, wherein the conduit is a casing or a layer of set cement.

18. The system of claim 15, wherein the wellbore is the wellbore of a geothermal well.

19. The system of claim 15, wherein the pressure reducing metal element comprises a metal alloy having at least one alloyed metal selected from the group consisting of bismuth, antimony, gallium, aluminum, calcium, magnesium, and any combination thereof.

20. The system of claim 15, further comprising a fluid disposed between the two sealing element.

* * * * *